United States Patent Office.

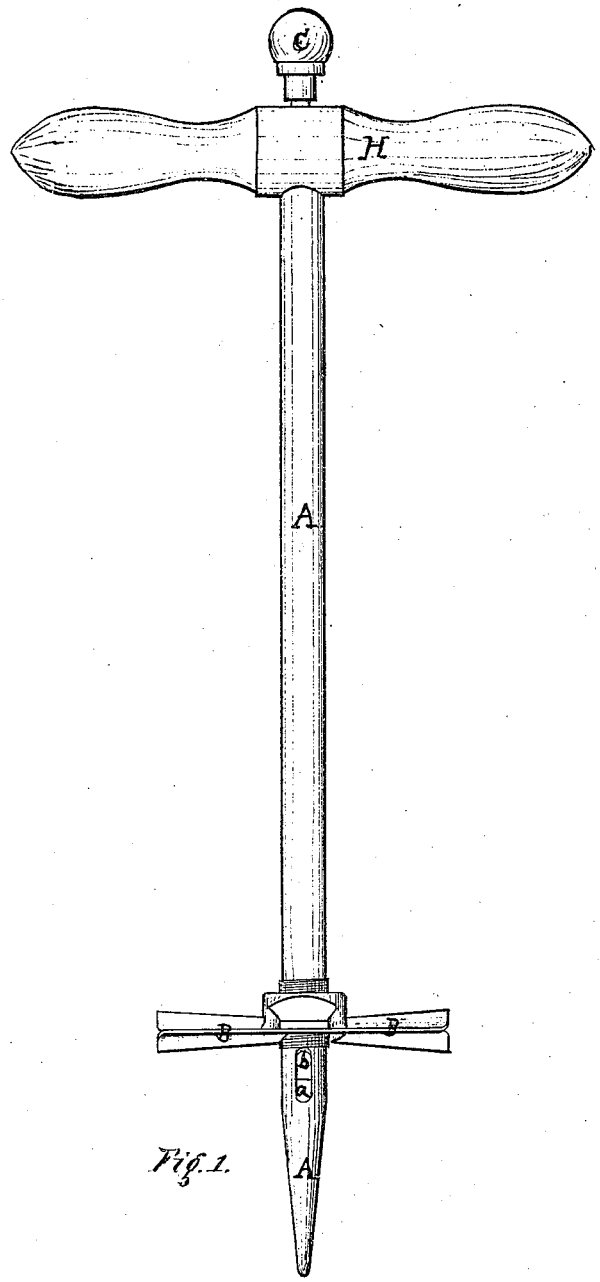
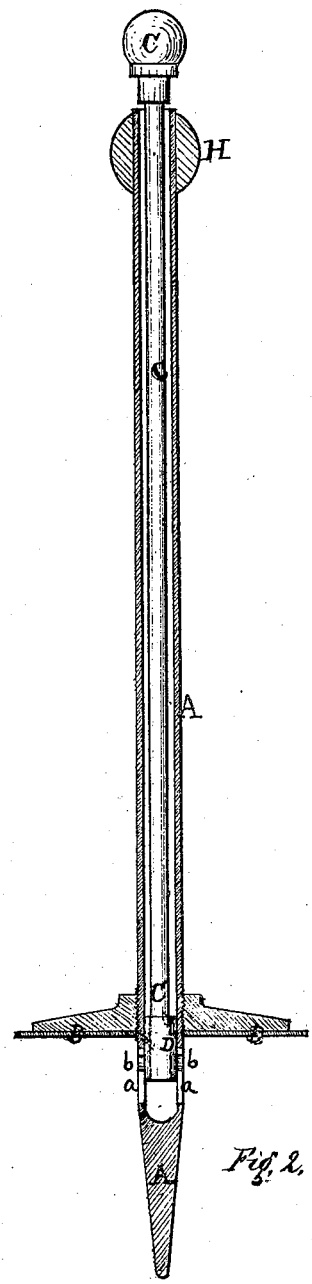

ALLEN BURTON, OF CHICAGO, ILLINOIS.

Letters Patent No. 76,598, dated April 14, 1868.

IMPROVEMENT IN POST-HOLE AUGERS.

The Schedule referred to in these Letters Patent and making part of the same.

TO ALL WHOM IT MAY CONCERN:

Be it known that I, ALLEN BURTON, of Chicago, in the county of Cook, and State of Illinois, have invented a new and useful Improvement in Post-Augers; and I do hereby declare and make known that the following is a full, clear, and exact description of the same, reference being had to the accompanying drawings, and the letters and figures marked thereon, which form part of this specification.

My invention relates to a novel mode of constructing augers for boring in the ground to form holes for fence-posts or other purposes; and it consists in admitting the air into the cavity below the auger, when in use, to facilitate the withdrawal of the auger and the earth upon it from the hole.

To enable those skilled in the art to understand how to construct and use my said invention, I will proceed to describe the same with particularity, making reference in so doing to the aforesaid drawings, in which—

Figure 1 represents a side elevation of my invention, and

Figure 2 is a central vertical section thereof.

Similar letters of reference in the different figures denote the same parts of my said invention.

A represents the rod upon which the auger B is arranged, by being turned or screwed thereupon, as indicated in fig. 2. This rod is constructed hollow to a point below the auger B, and is there provided with openings, $a\ a$, through which the air entering the top or other part of said tube A may escape. The auger is inserted or bored into the earth by turning the handles H. In the tube A is arranged a rod, C, extending down to a short tube, D, to which it is attached, said tube D being provided with lugs $b\ b$, which project through the aforesaid openings $a\ a$ in the tube A, so that the air entering the tube A, at any point above the auger B, may pass down through said tube D into the cavity below, and when the tube D is thrust down, it closes the openings $a\ a$, which is the position when the auger is being bored into the ground, but when the rod C is raised up, the apertures $a\ a$ are opened, and the air escapes into the hole below the auger B.

Instead of the tube D upon the end of the rod C, any suitable valve may be used, and, if desired, the rod C may be made hollow to the top, or the air may be admitted into the tube A at any point above the auger B, and in any convenient manner.

By admitting the air into the post-hole below the leaves of the auger, after the same has been turned into the ground a suitable distance, and when it is desired to draw out the auger, and so remove the loosened earth, the air below, counterbalances the vertical atmospheric pressure, and thus the only obstacles the operator has to overcome are the weight of the superincumbent earth, and friction, rendering the operation of boring the holes much easier and more rapidly accomplished.

Having described the construction and operation of my invention, I will now specify what I claim, and desire to secure by Letters Patent.

I claim, in combination with the hollow handle A, the rod C, arranged within said handle, and operating in the manner and for the purposes set forth.

ALLEN BURTON.

Witnesses:
L. L. COBURN,
W. E. MARRS.